US012094221B2

United States Patent
Guo et al.

(10) Patent No.: US 12,094,221 B2
(45) Date of Patent: Sep. 17, 2024

(54) EMBEDDED DEEP LEARNING MULTI-SCALE OBJECT DETECTION MODEL USING REAL-TIME DISTANT REGION LOCATING DEVICE AND METHOD THEREOF

(71) Applicant: National Yang Ming Chiao Tung University, Hsinchu (TW)

(72) Inventors: Jiun-In Guo, Hsinchu (TW); Bo-Xun Wu, Hsinchu (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 344 days.

(21) Appl. No.: 17/696,044

(22) Filed: Mar. 16, 2022

(65) Prior Publication Data

US 2023/0206654 A1 Jun. 29, 2023

(30) Foreign Application Priority Data

Dec. 28, 2021 (TW) .................................. 110149226

(51) Int. Cl.
*G06V 20/56* (2022.01)
*G06T 7/536* (2017.01)

(52) U.S. Cl.
CPC ............ *G06V 20/588* (2022.01); *G06T 7/536* (2017.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 11,120,566 B2 * | 9/2021 | Guo | G06T 7/536 |
| 11,170,470 B1 * | 11/2021 | He | G06T 3/4007 |
| 2019/0050993 A1 * | 2/2019 | Jang | G06V 20/588 |
| 2019/0138676 A1 * | 5/2019 | Akella | G06Q 10/06 |
| 2019/0180418 A1 * | 6/2019 | Kuybeda | G06T 5/50 |
| 2021/0064913 A1 * | 3/2021 | Ko | G06F 18/253 |
| 2021/0279950 A1 * | 9/2021 | Phalak | G06F 18/2431 |
| 2022/0269910 A1 * | 8/2022 | Onzon | G06N 3/045 |
| 2023/0128432 A1 * | 4/2023 | Yeh | G06F 18/24133 382/181 |
| 2024/0056694 A1 * | 2/2024 | Ozone | H04N 25/42 |
| 2024/0071209 A1 * | 2/2024 | Murphy | G08G 1/005 |

OTHER PUBLICATIONS

Gu et al., "3-D LiDAR + Monocular Camera: An Inverse-Depth-Induced Fusion Framework for Urban Road Detection," IEEE Transactions on Intelligent Vehicles, vol. 3, No. 3, Sep. 2018 (Year: 2018).*

* cited by examiner

*Primary Examiner* — Soo Shin
(74) *Attorney, Agent, or Firm* — BACON & THOMAS, PLLC

(57) ABSTRACT

The present invention provides a deep learning object detection method that locates the distant region in the image in real-time and concentrates on distant objects in a front dash cam perspective, trying to solve a common problem in advanced driver assistance system (ADAS) applications, that the detectable range of the system is not far enough.

6 Claims, 10 Drawing Sheets

EMBEDDED DEEP LEARNING MULTI-SCALE OBJECT DETECTION MODEL USING REAL-TIME DISTANT REGION LOCATING DEVICE AND METHOD THEREOF

BACKGROUND OF THE INVENTION

1. Field of the Invention

The present invention relates to an object detection field, particularly to an embedded deep learning multi-scale object detection model using real-time distant region locating device and method thereof.

2. Description of the Prior Art

Recently, in the computer information field, due to the flourishing development of deep learning techniques, the expression of computer vision technique has already been approaching the expression of human eyes, and the relevant technical topics have become very hot correspondingly. In these computer vision techniques, a large amount of computer vision understanding techniques have been used in the advanced driver assistance system (ADAS), where the object detection techniques have been used in various car safety assist driving systems, such as Forward Collision Warning System (FCWS), Rear Collision Warning System (RCWS), Brake Assist System (BAS), Advanced Emergency Braking System (AEBS), Lane Departure Warming System (LDWS), and Blind Spot Detection System (BSDS), etc. At present, the above-mentioned systems can be effectively used in automatic assist car driving, which not only can effectively lighten the long driving fatigue, but also can effectively achieve the car driving assist effect, and further increase the safety of driving.

When the car is driven at high speed, the detection of distant object will become very important. However, the distant object will usually be shown as a small object in the detected image, also, the characteristics will be presented less. Based on the imaged object recognized under distant object detection, the obtained effect will be poorer. Thus, a lot of traffic accidents occur because it is unable to dodge the object suddenly resting on the lane in time, such as the stalled vehicle, vehicle stayed in front of road due to traffic accident, or other obstacles rested in front of road. Therefore, detecting the small distant objects at this moment has become an important and necessary detection technique for ensuring safe car driving.

As for the conventional detection of small distant objects, it is necessary to adopt the high-resolution image for regarding as the object recognition, in order to carry on follow-up analysis for obtaining enough object characteristics. However, it will take a large amount of computation time by directly using high-resolution image to catch the characteristics. If the whole picture is caught directly, it will cause that the characteristics of small objects will be insufficient to detect sufficient information. Most conventional objects detection systems are rule-based techniques. It is necessary to aim at various object characteristics and use specific characteristics catching methods to define the objects, such as the car, people, etc. If there is abominable weather or complicated environmental background, or the uncommon object appeared on the road, or the characteristics of object are lost due to deformation or fast movement of object, it will cause substantial drop of detection accuracy and stability. Thus, as for the conventional image detection technique, such as S. Teoh's research team uses the image edge detection method and the left-right symmetrical characteristics of car, to generate the probable appearance position of detected target object. However, if the car direction taken by camera is not located right behind the car, the car will not possess the symmetrical characteristics, so that the detection effect will be influenced tremendously. The detected object cannot be too small, it is necessary to possess certain amount of edge characteristics, otherwise, it will be unable to be judged as the car.

As for the other prior art, V. Růžička's research team used deep learning for object detection. Firstly, the low-resolution image of downsampling is used for carrying on the preliminary object detection. In the detected object frame, find out the part of smaller size, in order to be regarded as the detection position required to be focused again. At the nearby position, catch the high-resolution image for carrying on the second object detection. It is necessary to infer that the smaller object can be detected successfully from the first model. The function can be confirmed that the confidence of small object can be obtained. However, if the object is too small, it will be unable to be detected successfully. Under the distant object detection in the driving field, the detection is also unable to be carried out too far.

As for another prior art, M. Najibi's research team used deep learning for carrying on object detection, and the network was added to predict the probable position probability picture of small object. Firstly, the low-resolution image of downsampling is used for carrying on the preliminary object detection, in order to determine the probable position of predicted small object. Then, near the high probability distribution region, catch high-resolution images from the original picture, carry on lesser downsampling, go back to the original procedure and implement it once again repeatedly, until there is no appearance of small objects with high probability. The objects should be large, or small objects appear gradually. If there is appearance of too small objects, and there are no slightly larger objects to guide the system to focus on its region, other small objects might be missed. Furthermore, the numerous inference objects detection models are required. When there are too many objects which are quite dispersed, it will produce too long operation and implementation time. There is another TSENG prior art, that used deep learning object detection technique which had multi-layer convolutional neural network structure. Interweave the pooling layer from each layer, and the object detection layer will be received for processing at the neural network output of rear layers. The results are summarized, and the final object detection result is outputted. This model will focus on smaller object detection in the shallower neural network output part, and the deeper part will focus on larger object detection, which can detect different multi-scale objects. However, due to the shallow layer only catches lesser object characteristics, and it is harder to completely judge the classification of small objects usually, so that the obtained confidence will be relatively poor. As for the detection way of distant small objects, use the low-resolution images to guess the probable position of small objects first, and then catch each position to enter into object detection model for detecting detailed object frame and classification from high-resolution images. As for this detection way, the objects can't be too small, otherwise when using the low-resolution images to predict the probable position of small objects at the first stage, and the characteristics might be too few to judge the object frame and classification, so that the detection might not be successful.

Therefore, it is necessary to improve the prior art of deep learning object detection technique, in order to solve the shortcoming of the prior art of deep learning object detection technique. This is also an urgent topic which has to be improved in the technical field of relevant sectors.

SUMMARY OF THE INVENTION

In view of the above-mentioned description, the present invention proposes an embedded deep learning multi-scale object detection model using real-time distant region locating device and method thereof, in order to solve the shortcoming of the prior art.

The purpose of the present invention is to overcome the shortcoming of existing technique, proposes an embedded multi-function deep learning network, which have good computation efficiency and can develop the optimal distant smaller object detection system without increasing the computation amount.

The purpose of the present invention relates to an embedded deep learning multi-scale object detection model using real-time distant region locating device and method thereof, which catches big objects image through downsampling, and reserves the characteristics of small objects, in order to achieve the purpose of high detection accuracy.

The purpose of the present invention is to base on the above-mentioned embedded deep learning multi-scale object detection model using real-time distant region locating device and method thereof, which also has high-efficiency deep learning object detection structure of distant/nearby object detection accuracy and algorithm operation speed. Under lower computation amounts, it has better object detection accuracy.

The structure of the present invention can be applied to majority of famous deep learning object detection model, and operated in the automotive embedded Nvidia Jetson Xavier platform.

In order to achieve the above-mentioned purpose and other purposes, the present invention provides an embedded deep learning multi-scale object detection model using real-time distant region locating method, which can be used for drive recording to detect the farthest objects in the picture, comprising:

Catching the image from the picture, the image includes the coordinate of original picture;

Making downsampling image processing for the image, to obtain the downsampling image;

Using the multi-function deep learning network to catch the characteristics of downsampling image from the downsampling image;

Inputting the characteristics of the downsampling image to vanishing point detection subnetwork, to judge the vanishing point;

Regarding the region around vanishing point as trim frame, trim the high-resolution image in the trim frame;

Using the multi-function deep learning network to catch the characteristics of high-resolution image from the trimmed high-resolution image;

Using the object detection subnetwork to analyze the object high-resolution result, the object analysis result includes a plurality of object frames; and, Integrating the vanishing point detection result, and the object high-resolution detection results, and outputting the detection results.

After Step (c), the present invention further includes the following steps:

Inputting the characteristics of downsampling image to the object detection subnetwork, analyzing the object downsampling detection results, the object downsampling detection result includes a plurality of downsampling object frames;

Executing the original Step (h), in order to get (h)', integrating the vanishing point detection result, the object downsampling detection results, and the object high-resolution detection results, and outputting the detection results.

After Step (d), the present invention further includes Step (h), integrating the vanishing point detection result, and the object high-resolution detection results, and outputting the detection results.

In Step (d) of the present invention, the analyzed vanishing point detection result is the computed maximum confidence number.

The vanishing point detection subnetwork of the present invention is the trained vanishing point detection multi-function deep learning network, including 1×1 convolution computation, flat layer and all connecting layers.

Between Step (d) and Step (e), the present invention further comprises:

(d1) Dividing the downsampling images into the coordinate with appointed grids;

(d2) Labelling the vanishing point result in the coordinate, to become the vanishing point coordinate;

(d3) Converting the vanishing point coordinate into the classification;

(d4) Converting the classification into the classification coordinate, and substituting the vanishing point coordinate by this classification coordinate.

Step (h) of the present invention includes the followings:

(h1) Making non-maximum restriction processing for these vanishing point detection results, object downsampling detection results, and object high-resolution detection results, respectively;

(h2) Using the upper left coordinate of the trim frame as the offset, shift these high-resolution object frames of object high-resolution results to the coordinate of original picture; and, (h3) Removing these high-resolution object frames at the edge of trimmed high-resolution images, combing the surplus high-resolution object frames and downsampling object frames, and making non-maximum restriction processing.

Step (i) and (d) of the present invention can be executed repeatedly to get the detection results in a plurality of layers.

In order to achieve the above-mentioned purpose and other purposes, the present invention provides an embedded deep learning multi-scale object detection model using real-time distant region locating device, which can be used in drive recording to obtain the farthest objects in the detection picture, comprising:

Image catch unit, used for catching the image of picture; process unit, used for making the downsampling image processing of the image, to obtain the downsampling image, the process unit connects the image catch unit; storage unit, which connects the process unit, the process unit stores the object detection subnetwork, multi-function deep learning network and vanishing point detection subnetwork; where, the process unit uses the multi-function deep learning network to catch the characteristics of downsampling image from the downsampling image, inputs the characteristics of downsampling image to the vanishing point detection subnetwork, the process unit analyzes the vanishing point detection result, to judge the vanishing point, the process unit regards the region around vanishing point as trim frame, trims the high-resolution image in the trim frame, the process unit uses multi-function deep learning network to catch the characteristics of high-resolution image from the trimmed high-resolution image, uses the object detection subnetwork to analyze the object high-resolution result, the object analysis result includes a plurality of object frames, the process unit integrates the vanishing point detection result and the object high-resolution detection results, and outputs the detection results.

The present invention inputs the characteristics of downsampling image to the object detection subnetwork, the process unit analyzes the object downsampling detection results, the object downsampling detection results includes a plurality of downsampling object frames, the process unit integrates the vanishing point detection result, the object downsampling detection results, and the object high-resolution detection results, and outputs the detection results.

Compared to the conventional technique, the present invention provides an embedded deep learning multi-scale object detection model using real-time distant region locating method, using the low-resolution input to make nearby object detection at the first stage, and predicts the vanishing point region, catches the picture adjacent to vanishing point from the high-resolution original picture as the distant picture. Subsequently, carrying on the second object detection, to detection the distant objects, finally, combining the distant/nearby object detection results through a specific post processing algorithm, to obtain a complete object detection result.

Through the image catch device, the present invention uses fixed frequency to catch the image information in front of vehicle, inputs the image with arbitrary resolution, provides clear trichromatic (RGB) image, and higher resolution can be used to detect farther objects.

After the present invention catches the downsampling image to low-resolution image, inputting to the multi-function deep learning network, catching the image characteristics vector matrix, and inputting to object detection subnetwork and vanishing point detection subnetwork, to get larger object, that is closer object detection results and image picture vanishing point, then based on this vanishing point, catch the set small region nearby high-resolution original picture, sent again to the multi-function deep learning network and object detection subnetwork without downsampling, detecting smaller distant object result, finally, using a specific post processing method to combine these two detection results to obtain final result.

Compared to the conventional prior technique, the present invention has the following development advantages:

The present invention adopts the deep learning method to carry on the catch of image characteristics. Compared to the algorithm of conventional technique, the present invention has higher accuracy and stability with respect various weathers, diversified backgrounds, and various object types.

The present invention uses the multi-function deep learning network to compute two tasks of object detection and vanishing point detection in a same network, where these two tasks share the trunk structure of network together, which can save the computation amount greatly. Based on this advantage, the present invention can effectively detect distant objects without increasing too much computation amount. Therefore, the present invention can effectively process a great deal of computation amount required by the deep learning network.

As for the sensor required by the present invention, only an image catch device can be adopted to detect nearby and distant objects. Compared to some conventional technique systems, the present invention, the wide-angle lens and telephoto lens should be adopted, in order to detect nearby objects and distant objects, respectively. The present invention can save the more use cost further.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The attached figures should be used to describe the implement way of the present invention. In the figures, the same element symbol is used to represent the same element, in order to describe the element more clearly, its size or thickness might be scaled.

Firstly, please refer to FIG. 1, FIG. 2A, FIG. 2B, FIG. 2C, FIG. 2D, FIG. 3, FIG. 4A, FIG. 4B, FIG. 5, and FIG. 6.

Figure 1:
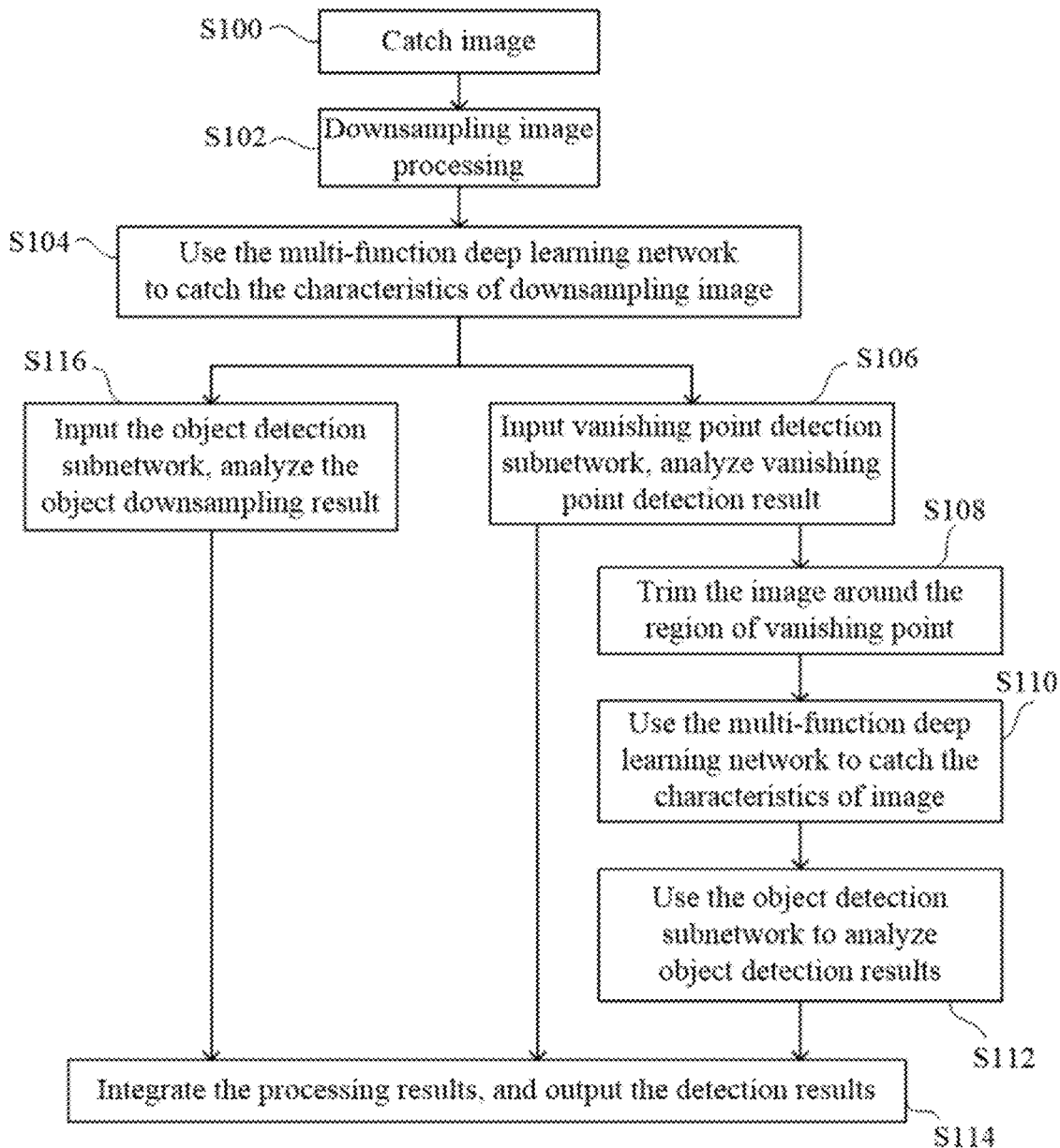
FIG. 1 is the flow diagram schematically illustrating the embodiment of an embedded deep learning multi-scale object detection model using real-time distant region locating method for the present invention.
Figure 2A:
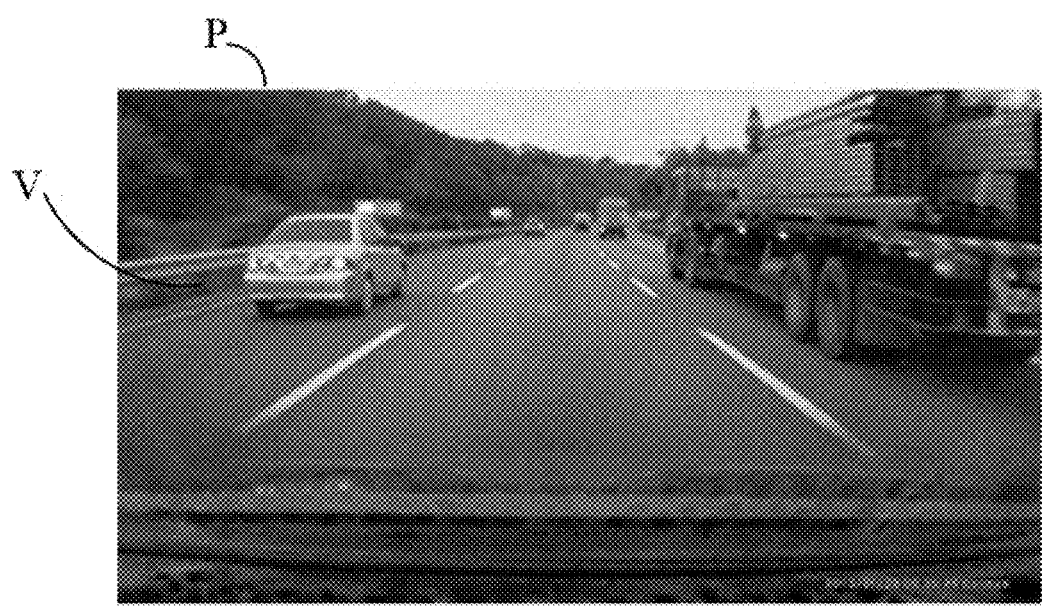
FIG. 2A is the diagram schematically illustrating the catch picture of the present invention.

FIG. 1 is the flow diagram schematically illustrating the embodiment of an embedded deep learning multi-scale object detection model using real-time distant region locating method for the present invention. It is known that the present invention provides an embedded deep learning multi-scale object detection model using real-time distant region locating method, which can be used for drive recording to detect the farthest objects in the picture, comprising:

Firstly, as shown in Step S100 of FIG. 1, catch the image V from the picture P, and refer to the catch picture of the present invention shown in FIG. 2A.

Figure 2B:
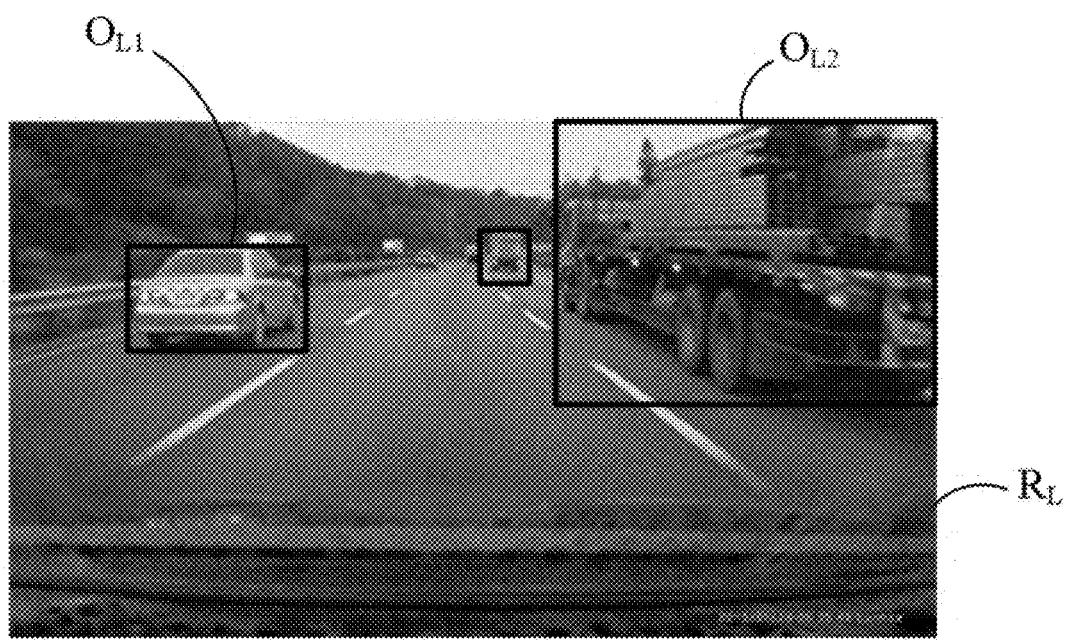
FIG. 2B is the diagram schematically illustrating the downsampling image of the present invention.
Figure 6:
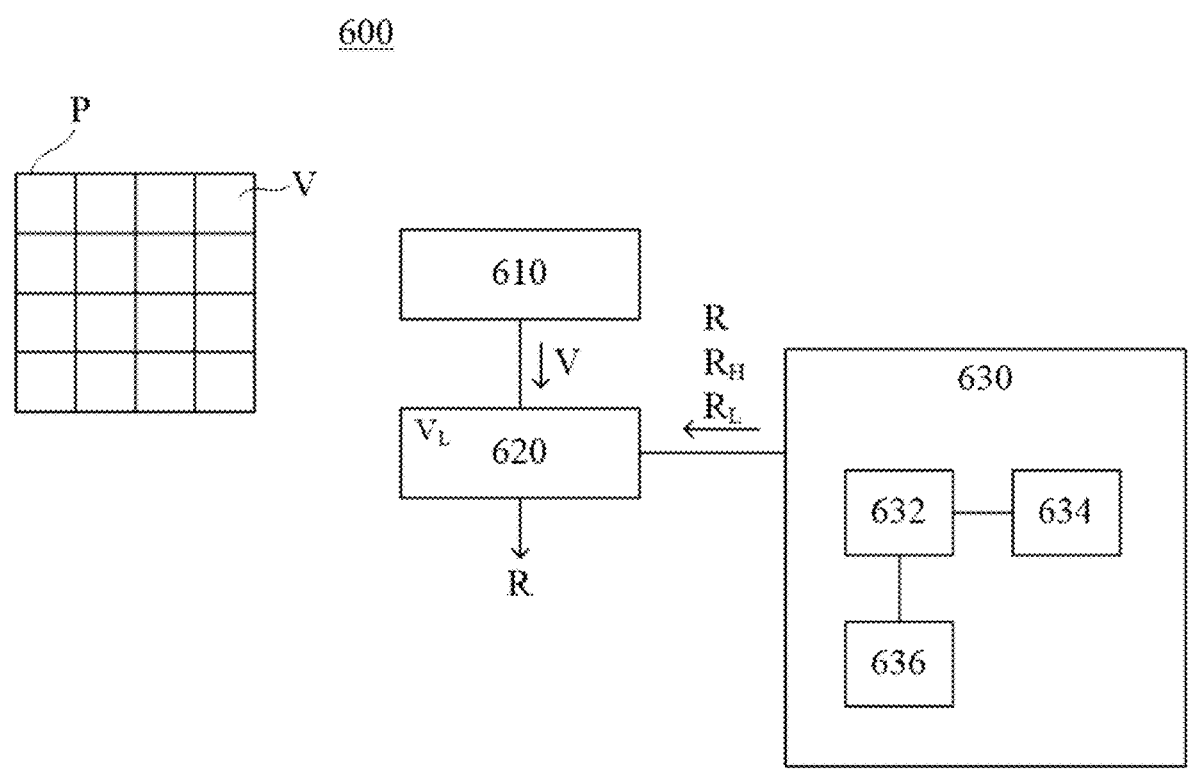
FIG. 6 is the diagram schematically illustrating the embodiment of an embedded deep learning multi-scale object detection model using real-time distant region locating device for the present invention.

As shown in Step S102 of FIG. 1, make downsampling image processing for the image, to obtain the downsampling image $V_L$ as shown in FIG. 6, and refer to the downsampling image of the present invention shown in FIG. 2B.

As shown in Step S104 of FIG. 1, use the multi-function deep learning network to catch the characteristics of downsampling image from the downsampling image $V_L$, and still refer to the downsampling image of the present invention shown in FIG. 2B.

Figure 2C:
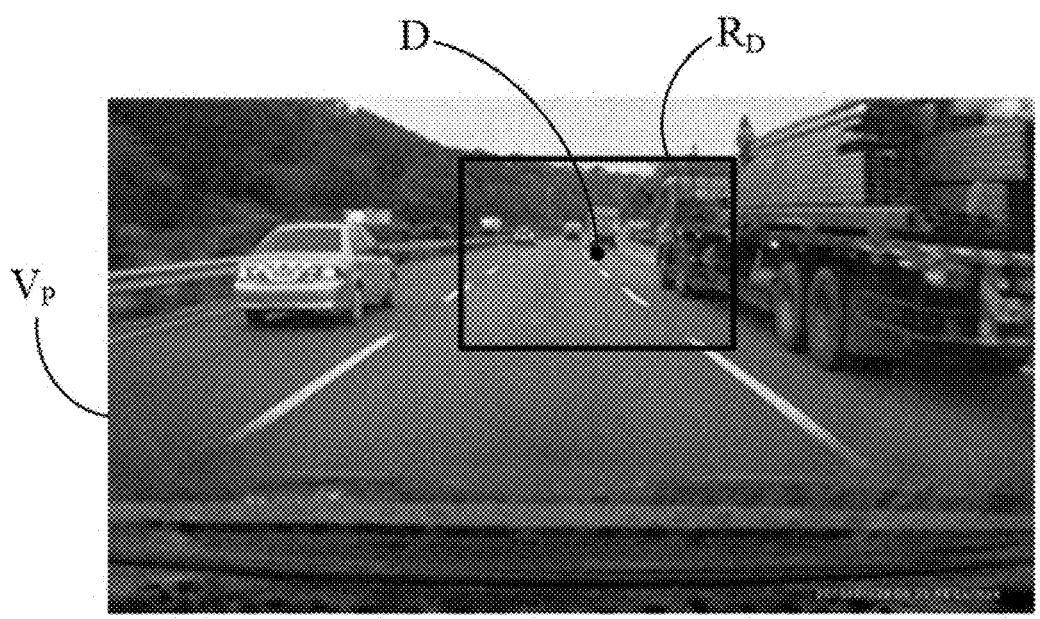
FIG. 2C is the diagram schematically illustrating the vanishing point detection result image of the present invention.

As shown in Step S106 of FIG. 1, input the characteristics of the downsampling image $V_L$ to vanishing point detection subnetwork, analyze vanishing point detection result $V_P$, to judge the vanishing point D, as vanishing point detection result image shown in FIG. 2C of the present invention. It has to describe that as the vanishing point detection subnetwork diagram shown in FIG. 3 of the present invention. The vanishing point detection subnetwork of the present invention is the trained vanishing point detection multi-function deep learning network, including 1×1 convolution computation 320, flat layer 340 and all connecting layer 360.

Figure 2D:
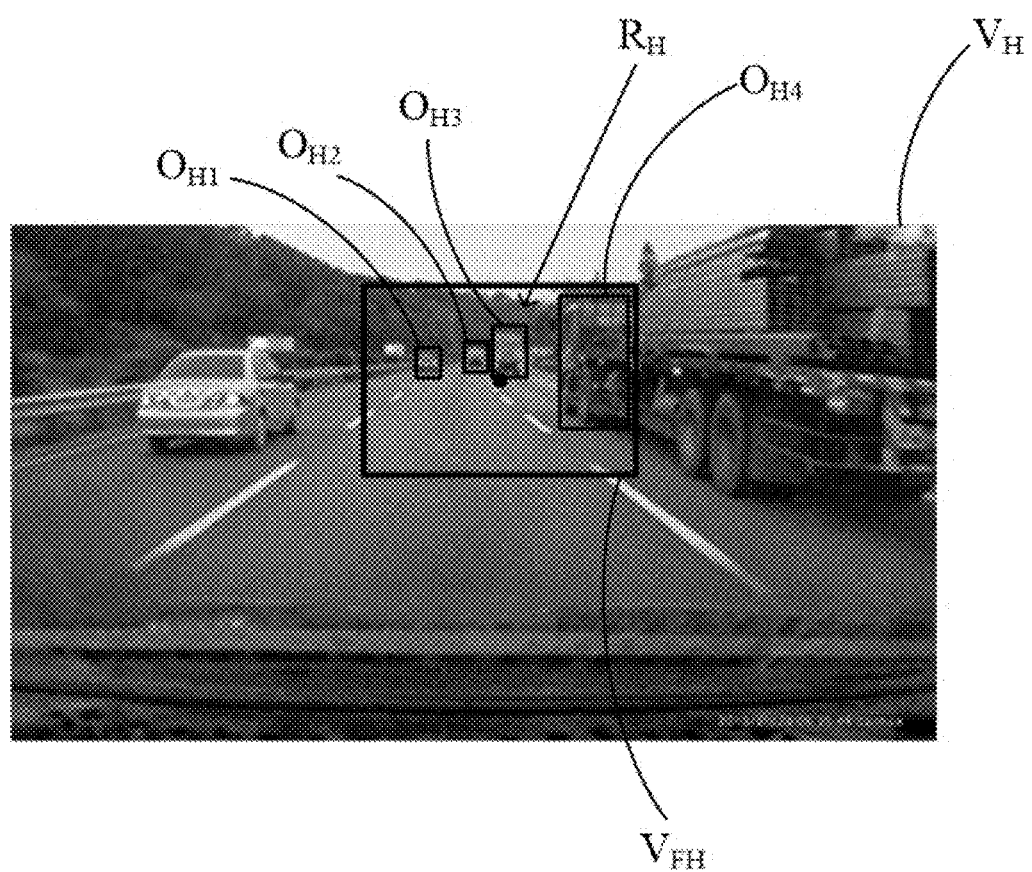
FIG. 2D is the diagram schematically illustrating the vanishing point detection result image of the present invention diagram.

As shown in Step S108 of FIG. 1, regard the region (that is vanishing point detection result $V_P$) around vanishing point D shown in FIG. 2C as trim frame, corresponding to the high-resolution image $V_H$ of image P, trim the high-resolution image in the trim frame to obtain the high-resolution image $V_{FH}$, as shown in FIG. 2D. It has to describe that the region around vanishing point D shown in FIG. 2C is a predetermined distance expanded from the vanishing point D as the center, and the predetermined distance can be adjusted in accordance with the image resolution.

Figure 4A:
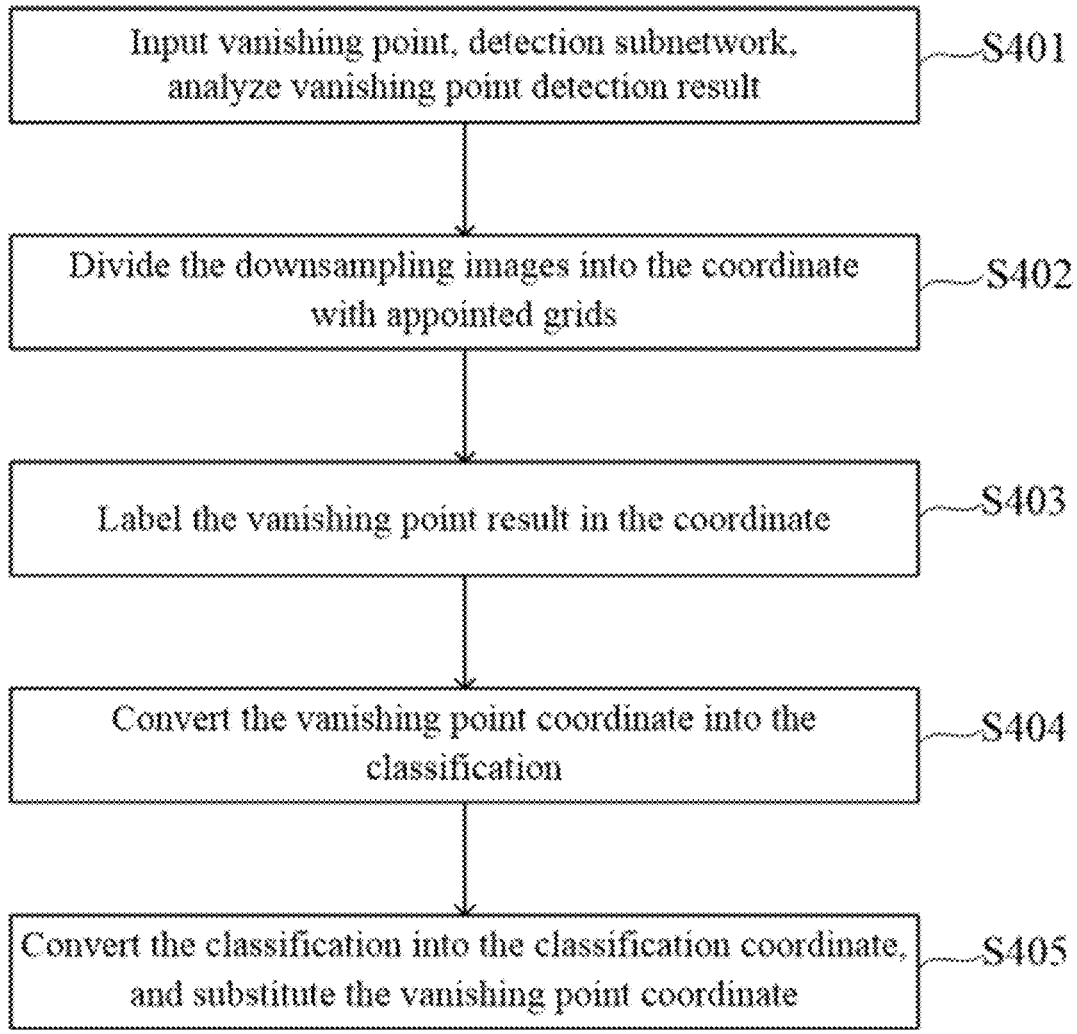
FIG. 4A is the flow diagram schematically illustrating the embodiment of the present invention for the steps of analyzing vanishing point and the method for trimming the trimmed high-resolution image in the trim frame.

Please refer to FIG. 4A of the present invention for the steps of analyzing vanishing point, and the steps of trimming the trimmed high-resolution image in the trim frame.

Refer to Step S401 of FIG. 4A, input the characteristics of downsampling image to the vanishing point detection subnetwork, analyze vanishing point detection result, to judge the vanishing point; and as shown in Step S405 of FIG. 4A, regard the region around vanishing point as the trim frame, trim the trimmed high-resolution image in the trim frame, further comprising:

Refer again to Step S402 of FIG. 4A, divide the downsampling image $V_L$ into the coordinate with appointed grids. For example, divide it into 16×9 grids as shown in the embodiment. It has to describe that the coordinate grids of the present invention can be adjusted in accordance with actual requirement, which is not limited to the grids stated in the above-mentioned embodiment.

Figure 5:
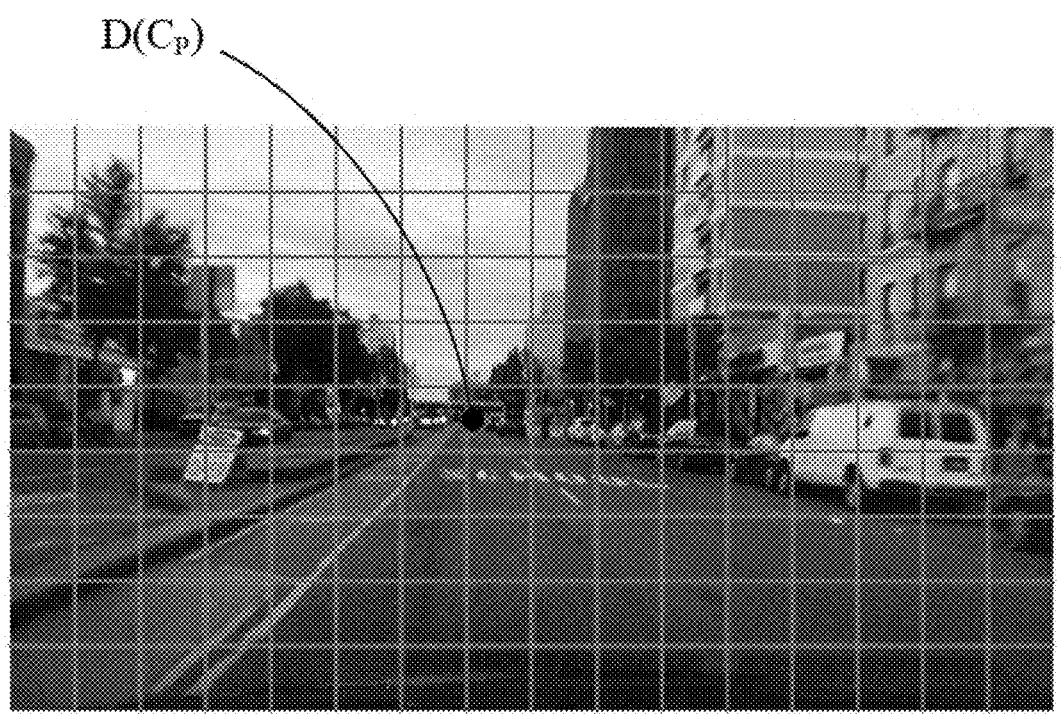
FIG. 5 is the diagram schematically illustrating the image coordinate of the embodiment of the present invention.

Refer again to Step S403 of FIG. 4A, label the vanishing point result $V_P$ shown in FIG. 2C in the coordinate, to become the vanishing point coordinate $C_P$, as the image coordinate diagram shown in FIG. 5.

Refer to Step S404 of FIG. 4A, convert the vanishing point coordinate $C_P$ shown in FIG. 5 into the classification.

Refer to Step S405 of FIG. 4A, convert the classification into the classification coordinate, and substitute the vanishing point coordinate by this classification coordinate. Where, in Step S401 of FIG. 4A, the analyzed vanishing point detection result is the computed maximum confidence number.

As shown in Step S110 of FIG. 1, the present invention uses the multi-function deep learning network to catch the characteristics of high-resolution image from the trimmed high-resolution image $V_{FH}$, as shown in FIG. 2D.

As shown in Step S112 of FIG. 1, the object high-resolution detection result is shown by using the object detection subnetwork. The object high-resolution detection results include a plurality of high-resolution object frames, the first high-resolution object frame $O_{H1}$, the second high-resolution object frame $O_{H2}$, the third high-resolution object frame $O_{H3}$, and the fourth high-resolution object frame $O_{H4}$, as shown in FIG. 2D. The object detection subnetwork of the present invention includes the RetinaNet, YOLOv3, FCOS, FoveaBox, RepPoints, Anchor-base, and Anchor-free model.

As shown in Step S114 of FIG. 1, integrate the vanishing point detection result $R_D$ shown in FIG. 2C, and the object high-resolution detection results $R_H$ shown in FIG. 2D, and output the detection results.

Figure 4B:
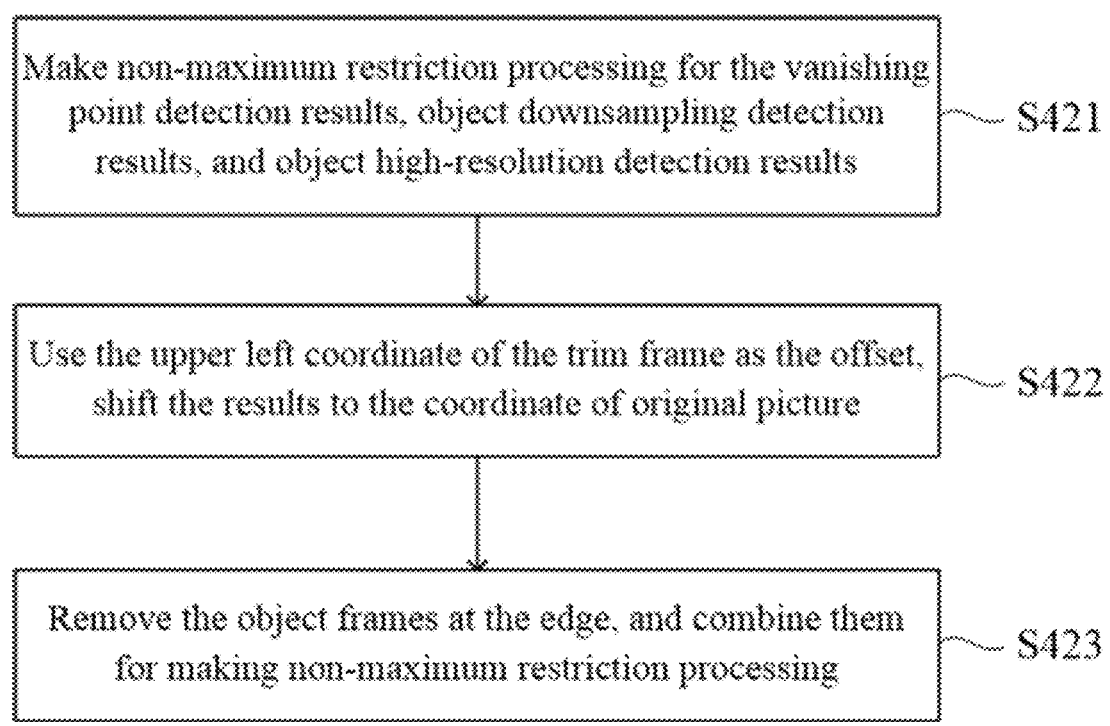
FIG. 4B is the flow diagram schematically illustrating the embodiment of the present invention for integrating the vanishing point detection result and object high-resolution detection results, and outputting the detection results.

Please refer to FIG. 4B, after Step S104, FIG. 4B further includes the following steps:

As shown in Step S116 of FIG. 1, input the characteristics of downsampling image to the object detection subnetwork, and analyze the object downsampling detection results $R_L$ shown in FIG. 2B. It has to describe that the object downsampling detection results RL of the present invention as shown in FIG. 2B includes a plurality of downsampling object frames, the first downsampling object frame $O_{L1}$ as shown in FIG. 2B, and the second downsampling object frame $O_{L2}$ as shown in FIG. 2B.

As shown in Step S114 of FIG. 1, integrate the vanishing point detection result $R_D$ as shown in FIG. 2C, the object downsampling detection results $R_L$ as shown in FIG. 2B, and the object high-resolution detection results $R_H$ as shown in FIG. 2D, and output the detection results.

It has to describe that the execution of Step S116 in FIG. 1 and Step S106 in FIG. 1 is not limited to one time, Step S116 and Step S106 can be executed repeatedly until a plurality of detection results are obtained.

In another embodiment of the present invention, after Step S106 of FIG. 1, it further includes Step S114 of FIG. 1, integrate the vanishing point detection result and the object high-resolution detection results, and output the detection results.

On the other hand of the present invention, FIG. 4B is the flow diagram schematically illustrating the embodiment of the present invention for integrating the vanishing point detection result and object high-resolution detection results, and outputting the detection results. It is known that in Step S114 of FIG. 1, the steps for integrating the vanishing point detection result and object high-resolution detection results, and outputting the detection results, further comprising: As shown in Step S421 of FIG. 4B, make non-maximum restriction processing for these vanishing point detection result, object downsampling detection results, and object high-resolution detection results, respectively.

As shown in Step S422 of FIG. 4B, use the upper left coordinate of the trim frame as the offset, shift these high-resolution object frames of object high-resolution results to the coordinate of original picture.

As shown in Step S423 of FIG. 4B, remove these high-resolution object frames at the edge of trimmed high-resolution images, combing the surplus high-resolution object frames and downsampling object frames, and making non-maximum restriction processing.

In the present invention, Step S116 of FIG. 1 to Step S114 of FIG. 1, or Step S106 of FIG. 1 to Step S114 of FIG. 1 to FIG. 1 is the first stage. Step S106 of FIG. 1 to Step S108, Step S110, Step S112, and Step S114 is the second stage. The present invention is implemented in two stages. The first stage can be implemented repeatedly, carry on the focus of more multi-layer visual field. Finally, carry on the vanishing point detection process specified in the second stage. But the present invention is not only limited to the object detection, any multi-scale image identification task is also the scope of the present invention.

FIG. 6 is the diagram schematically illustrating the embodiment of an embedded deep learning multi-scale object detection model using real-time distant region locating device for the present invention. Please refer to the above-mentioned FIG. 2A, FIG. 2B, FIG. 2C, and FIG. 2D. The embedded deep learning multi-scale object detection model using real-time distant region locating device 600 can be used in the drive recording to detect the farthest objects in the picture, comprising: image catch unit 610, the image catch unit 610 is used to catch the image V of picture P (refer to FIG. 2A), process unit 620, and storage unit 630.

As the process unit 620 shown in FIG. 6, make downsampling image V processing for the image in FIG. 2A, to obtain the downsampling image $V_L$. The process unit 620 connects the image catch unit 610 and storage unit 630. The process unit 630 stores the object detection subnetwork 632, multi-function deep learning network 634, and vanishing point detection subnetwork 636. Wherein the process unit 620 uses the multi-function deep learning network 634 to catch the characteristics of downsampling image from downsampling image $V_L$, as shown in FIG. 2B.

Figure 3:
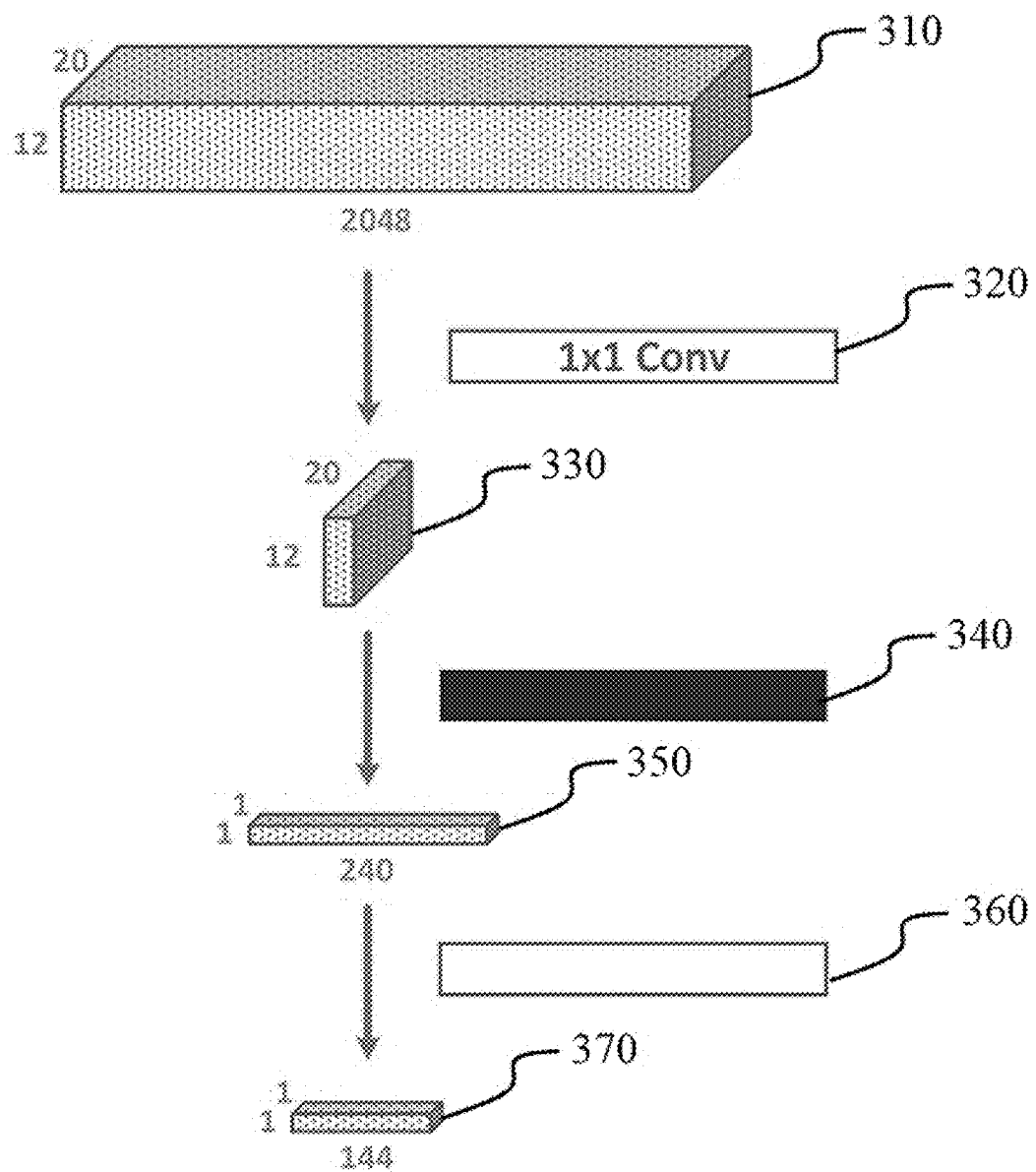
FIG. 3 is the diagram schematically illustrating the multi-function learning network of the present invention.

As for the structure of vanishing point detection subnetwork 636 shown in FIG. 6, FIG. 3 shows the diagram schematically illustrating the multi-function learning network of the present invention. The output matrix (as shown in FIG. 3) shown in the characteristics of downsampling image 310 caught by the multi-function deep learning network 634 shown in FIG. 6 can be sent to the deep learning network of trained vanishing point detection, its composition is 1×1 convolution computation 320, flat layer 340 and all connecting layer 360, first vector matrix 330, second vector matrix 350, and finally outputted third vector matrix 370, in order to compute its maximum confidence number, that is the predicted result $R_D$ of vanishing point shown in FIG. 2C.

Inputting the characteristics of downsampling image is shown in FIG. 6 to the vanishing point detection subnetwork 632, process unit 620 analyzes the vanishing point detection result $R_D$ shown in FIG. 2C, judge the vanishing point D shown in FIG. 2C. As the process unit 620 shown in FIG. 6, regard the region (vanishing point detection result $V_P$ shown in FIG. 2C) around vanishing point as trim frame, trim the high-resolution image $V_{FH}$ in the trim frame as shown in FIG. 2D.

The process unit 620 of FIG. 6 uses the multi-function deep learning network 634 to catch the characteristics of high-resolution image from the trimmed high-resolution image $V_H$ shown in FIG. 2D, and uses the object detection subnetwork 632 to analyze the object high-resolution detection results $R_H$ shown in FIG. 2D (also as shown in FIG. 6). As shown in FIG. 2D, the object high-resolution detection results $R_H$ includes a plurality of high-resolution object frames, the first high-resolution object frame $O_{H1}$, the second high-resolution object frame $O_{H2}$, the third high-resolution object frame $O_{H3}$, and the fourth high-resolution object frame $O_{H4}$.

The object detection subnetwork 632 shown in FIG. 6 is RetinaNet, YOLOv3, FCOS, FoveaBox, RepPoints, Anchor-base, and Anchor-free model. The process unit 620 shown in FIG. 6 integrates the vanishing point detection result $R_D$ shown in FIG. 2C, and the object high-resolution detection results $R_H$ shown in FIG. 2D, and output the detection result R shown in FIG. 6.

The process unit 620 shown in FIG. 6 inputs the characteristics of downsampling image to the object detection subnetwork 632, and analyzes the object downsampling detection results. The object downsampling detection results $R_L$ shown in FIG. 6 includes a plurality of downsampling object frames, the first downsampling object frame $O_{L1}$ shown in FIG. 2B, and the second downsampling object frame $O_{L2}$ shown in FIG. 2B.

The process unit 620 shown in FIG. 6 integrates the vanishing point detection result $R_D$ shown in FIG. 2C, the object downsampling detection results $R_L$ shown in FIG. 2B, and the object high-resolution detection results $R_H$, and outputs the detection results.

The present invention relates to an object detection method, which can be used for the visual angle of forward drive recorder, detects the farthest place of picture automatically, and focuses on the distant object. It is trying to solve the problem of advanced driver assistance system, where the detection distance is often not far enough. The present invention has an efficient multi-scale object detection network (ConcentrateNet), which can search the vanishing point of picture automatically, and pay close attention to its nearby region. At the first inference in the model, it will produce the objects under the larger visual field for the prediction of object detection result and vanishing point position. The vanishing point position represents the farthest place of picture. Then use the vanishing point position to make model inference around nearby region once again, to obtain the detection result of distant object. Finally, use non-maximum restriction processing to combine these two results.

The structure of the present invention can be applied to most object detection models. It is able to use several advanced object detection models and add the multi-scale object detection network structure to carry on the test. Compared to the original model using higher input picture to draw higher quality, the less computation amount can be used to obtain higher accuracy. For example, under the information BDD100K in large vehicle, YOLOv3 can directly use 960×540 high resolution to get AP 28.2% accuracy. The multi-scale object detection network uses 640×360 low-resolution still can get AP 30.7% accuracy. The recall rate of small object even can be increased from AR 24.9% to 35.7%. In addition, the present invention can test the multi-scale object detection network through the low power consumption embedded NVIDIA Jetson AGX Xavier platform.

The present invention provides an embedded deep learning multi-scale object detection model using real-time distant region locating method, which can be used for drive recording to detect the farthest objects in the picture, comprising:
(a) Catching the image from the picture, the image includes the coordinate of original picture;
(b) Making downsampling image processing for the image, to obtain the downsampling image;
(c) Using the multi-function deep learning network to catch the characteristics of downsampling image from the downsampling image;
(d) Inputting the characteristics of the downsampling image to vanishing point detection subnetwork, to judge the vanishing point;
(e) Regarding the region around vanishing point as trim frame, trim the high-resolution image in the trim frame;
(f) Using the multi-function deep learning network to catch the characteristics of high-resolution image from the trimmed high-resolution image;

(g) Using the object detection subnetwork to analyze the object high-resolution result, the object analysis result includes a plurality of object frames; and, (h) Integrating the vanishing point detection result, and the object high-resolution detection results, and outputting the detection results.

After Step (c), the present invention further includes the following steps:

(i) Inputting the characteristics of downsampling image to the object detection subnetwork, analyzing the object downsampling detection results, the object downsampling detection result includes a plurality of downsampling object frames;

Executing the original Step (h), in order to get (h)', integrating the vanishing point detection result, the object downsampling detection results, and the object high-resolution detection results, and outputting the detection results.

After Step (d), the present invention further includes Step (h), integrating the vanishing point detection result, and the object high-resolution detection results, and outputting the detection results.

In Step (d) of the present invention, the analyzed vanishing point detection result is the computed maximum confidence number.

The vanishing point detection subnetwork of the present invention is the trained vanishing point detection multi-function deep learning network, including 1×1 convolution computation, flat layer and all connecting layer.

Between Step (d) and Step (e), the present invention further comprises:

(d1) Dividing the downsampling images into the coordinate with appointed grids;

(d2) Labelling the vanishing point result in the coordinate, to become the vanishing point coordinate;

(d3) Converting the vanishing point coordinate into the classification;

(d4) Converting the classification into the classification coordinate, and substituting the vanishing point coordinate by this classification coordinate.

Step (h) of the present invention includes:

(h1) Making non-maximum restriction processing for these vanishing point detection results, object downsampling detection results, and object high-resolution detection results, respectively;

(h2) Using the upper left coordinate of the trim frame as the offset, shift these high-resolution object frames of object high-resolution results to the coordinate of original picture; and, (h3) Removing these high-resolution object frames at the edge of trimmed high-resolution images, combing the surplus high-resolution object frames and downsampling object frames, and making non-maximum restriction processing.

Step (i) and (d) of the present invention can be executed repeatedly to get the detection results in a plurality of layers.

The object detection subnetwork of the present invention includes the RetinaNet, YOLOv3, FCOS, FoveaBox, RepPoints, Anchor-base, and Anchor-free model.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An embedded deep learning multi-scale object detection model for a drive recording to detect far objects in a picture by using a real-time distant region locating method, comprising:
    (a) catching an image from a picture, said image having a coordinate of original picture;
    (b) carrying out a downsampling image processing for said image to obtain said downsampling image;
    (c) extracting characteristics of said downsampling image from said downsampling image by using a multi-function deep learning network;
    (c-i) inputting said characteristics of the downsampling image to an object detection subnetwork to detect an object, and analyzing an object downsampling detection result, said object downsampling detection result comprising a plurality of downsampling object frames;
    (d) inputting said characteristics of said downsampling image to a vanishing point detection subnetwork to determine said vanishing point;
    (d-h) integrating a vanishing point detection result, said object downsampling detection result, and an object high-resolution detection result, and outputting said object downsampling detection result;
    (e) regarding a region around said vanishing point as a trim frame, to trim a high-resolution image in said trim frame;
    (f) extracting said characteristics of said high-resolution image from a trimmed high-resolution image by using the multi-function deep learning network; and
    (g) analyzing the object high-resolution result, the object high-resolution result comprising a plurality of high-resolution object frames, by using the object detection subnetwork;
    wherein the step (d-h) includes steps of:
        (h1) carrying out non-maximum restriction processing for said vanishing point detection result, object downsampling detection result, and object high-resolution detection result, respectively;
        (h2) using an upper left coordinate of a trim frame as an offset, shifting high-resolution object frames of the object high-resolution result to a coordinate of an original picture; and
        (h3) removing the high-resolution object frames at an edge of trimmed high-resolution images, combining surplus high-resolution object frames and downsampling object frames, and carrying out a non-maximum restriction processing.

2. The method according to claim 1, wherein in step (d), said analyzed vanishing point detection result comprises a computed maximum confidence number.

3. The method according to claim 1, wherein said vanishing point detection subnetwork comprises a trained varnish point detection multi-function deep learning network, including a 1×1 convolution computation, a flat layer and fully connected layer.

4. The method according to claim 1, further comprising steps of, between the step (d) and the step (e):
    (d1) dividing the downsampling image into a coordinate with appointed grids;
    (d2) labeling a vanishing point result in said coordinate, to become a vanishing point coordinate;
    (d3) converting said vanishing point coordinate into a classification; and (d4) converting said classification into a classification coordinate system, and substituting said vanishing point coordinate by said classification coordinate system.

5. The method according to claim 1, wherein the object detection subnetwork is selected from the group of Retina-Net, YOLOv3, FCOS, FoveaBox, RepPoints, Anchor-base, and Anchor-free model.

6. The method according to claim 1, wherein the step c-i and the step (d) are executed repeatedly to obtain detection results in a plurality of layers.

* * * * *